Feb. 4, 1958 R. K. RAYNES 2,822,516
ELECTRIC COIL TESTER

Filed May 27, 1953 2 Sheets-Sheet 1

INVENTOR.
Roy K. Raynes
BY
*Zoltan Holochek*
ATTORNEY

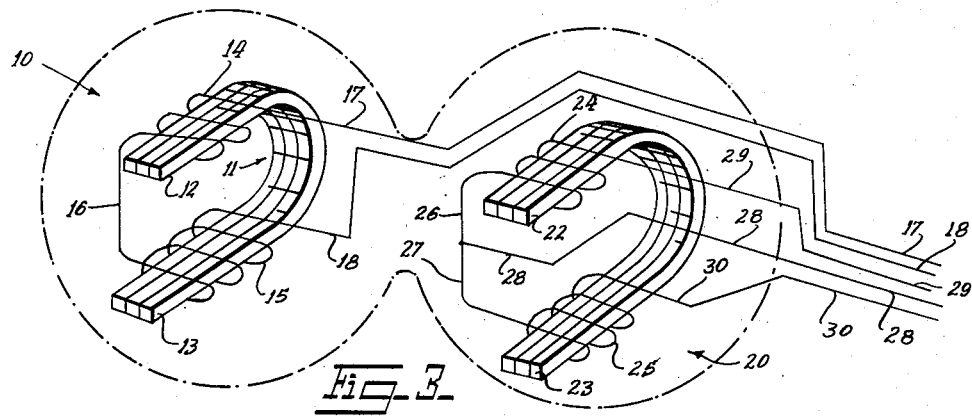
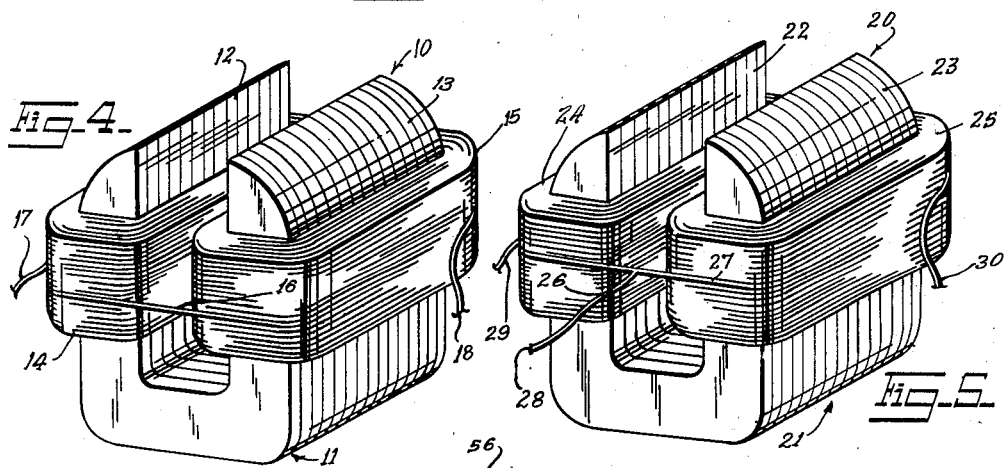
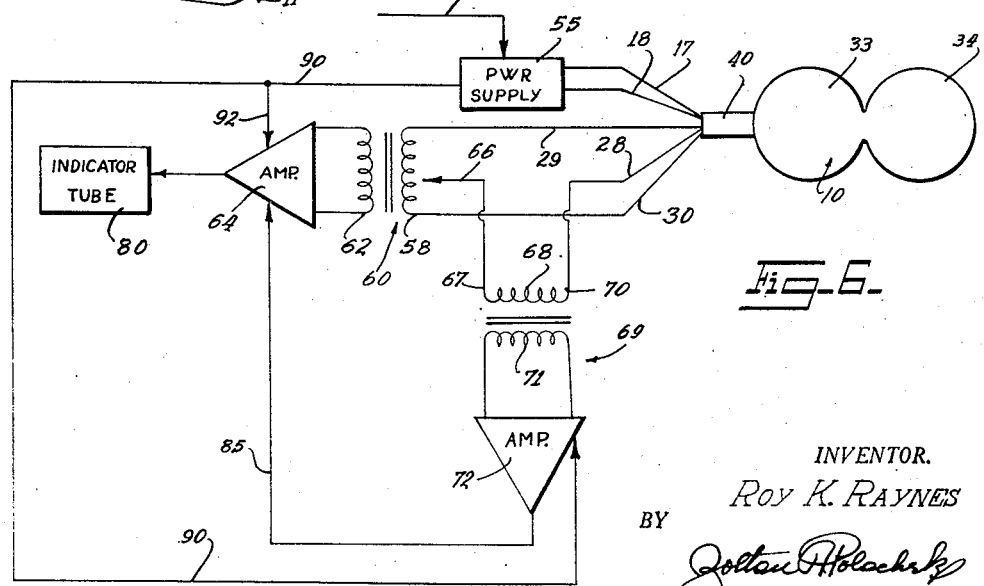

United States Patent Office 2,822,516
Patented Feb. 4, 1958

2,822,516

ELECTRIC COIL TESTER

Roy K. Raynes, Ocala, Fla.

Application May 27, 1953, Serial No. 357,660

5 Claims. (Cl. 324—51)

The invention relates to an electric coil tester for testing coils of electrical apparatus, and more particularly to testing coils of dynamo-electric machines for a short-circuited turn or turns in coils to be tested. The invention is also applicable to testing the rotor-bars of a squirrel-cage rotor for open circuit.

An object of the present invention is to provide a method of coil testing and an apparatus for carrying out that method.

Another object is to provide rapid and efficient testing of coils before or after installation in electrical apparatus.

Other objects will become more readily apparent after a study of the specifications and appended claims together with the drawing.

In the accompanying drawings:

Fig. 3 is a schematic view of the arrangement in Fig. 1 showing the manner in which the coils of the detecting means and the inducing means are connected.

Fig. 4 is a perspective view of the inducing means alone.

Fig. 5 is a perspective view of the detecting means alone.

Fig. 6 is a circuit diagram showing the complete circuit into which the inducing means and the detecting means are interconnected.

Figure 1:
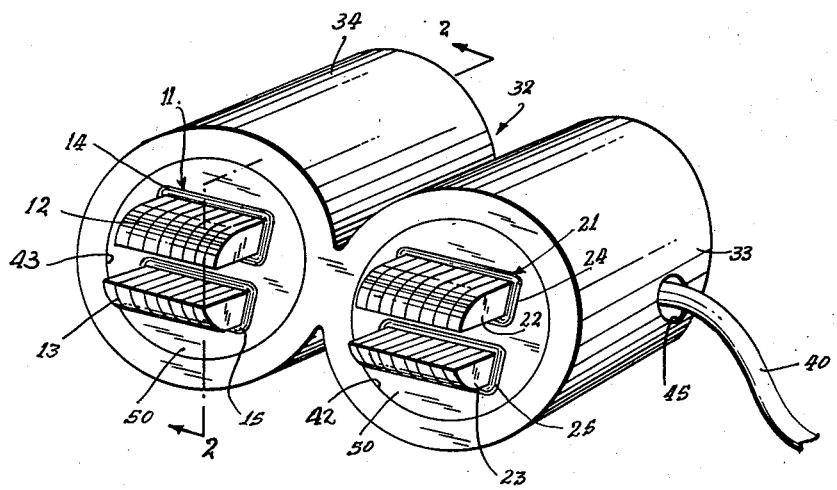
Fig. 1 is a perspective view showing a case containing the inducing and detecting means of the present apparatus.
Figure 2:
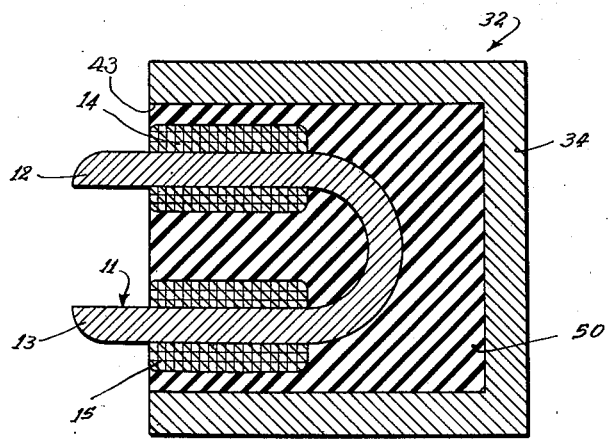
Fig. 2 is a cross-sectional view along the lines 2—2 in Fig. 1 showing the inducing means in position within the casing.

The inducing means 10 (Fig. 4) comprises a ferromagnetic structure 11 having a pair of spaced legs 12, 13, having an air gap therebetween, the legs having thereon windings 14 and 15 respectively. A common lead 16 interconnects windings 14 and 15 so that these are in series, the series combination thus formed having external leads 17, 18.

The detecting means 20 comprises a ferromagnetic structure 21 having a pair of spaced legs 22, 23, having an air gap therebetween, the legs having thereon windings 24, 25 respectively. One end 26 of coil 24 connects to one end 27 of coil 25 and a lead 28 extends from this common connection, a lead 29 extending from the other side of coil 24 and a lead 30 extending from the other side of coil 25.

Inducing means 10 and detecting means 20 may be disposed within a casing 32 having integral body portions 33, 34 and open at one end. The casing has the appearance of a figure 8 and a cable 40 containing the leads 17, 18, 28, 29 and 30 extends from the casing, lead wires 28, 29 and 30 being shielded from inductive coupling with the lead wires 17 and 18. The casing 32 is of soft iron and the body portions 33, 34 define a pair of compartments 42, 43 respectively for receiving the inducing means 10 and the detecting means 20 respectively. It will be noted that the pole faces 12, 13 and 22, 23 project outwardly through the open end of casing 32, to avoid a magnetic shunt across the same.

An opening 45 is provided in body portion 33 of casing 32 for cable 40 and openings (not shown) are provided intermediate the compartments 42, 43 for the lead wires 17, 18 of the inducing means 10.

In addition to housing the means 10 and 20, casing 32 provides magnetic screening between windings 14, 15 and windings 24, 25. An electrical insulating compound 50 is provided in chambers 42, 43 to insulate the windings 14, 15, 24 and 25 from the walls of the casing and from each other and to hold the ferromagnetic structures 11, 21 in their relative positions in the casing.

Leads 17 and 18 are connected to a power supply 55 connected by means 56 to a suitable power source, not shown. Leads 29 and 30 are connected to the primary winding 58 of an iron-core transformer to the secondary winding 62 of which is connected to an amplifier 64.

The primary 58 is provided with a center-tap 66 connected to one side 67 of the primary winding 68 of an iron-core transformer 69, the other side 70 of the primary 68 being connected to lead 28. The secondary winding 71 of transformer 69 is connected to an amplifier 72.

Amplifier 72 derives power from power source 55 by means 90, while amplifier 64 derives power from power source 55 by means 92.

The output of amplifier 72 is fed by means of 85 to amplifier 64 as a negative bias voltage to cancel the effect on amplifier 64 of the current flowing in the primary of transformer 60 when this current does not traverse exclusively lead wires 29 and 30. The wire size, number of turns in the windings of the inducing and detecting means and the size of the ferromagnetic structures will be governed by the voltage, frequency and amplification selected to operate the indicating means in the event of at least one short-circuited turn in a coil to be tested through the calculated magnetic reluctance, the impedances of the electric circuits connected to the detecting winding should be so chosen that the most efficient transfer of energy will occur between the detecting winding and the electric circuit connected thereto.

The complete magnetic circuits of the two ferromagnetic structures being in a simultaneous sympathetic magnetic relationship to one another when and if a coil under test contains at least one short-circuited turn or forms a closed circuit, one of the structures with its winding acting as an inducing means when connected to an alternating current power supply, the other structure with its centre-tapped winding acting as a detecting means when connected in an operative condition with an indicating means. A coil under test if it contains at least one short-circuited turn, the short-circuited turn acting as the link between the inducing means and the detecting means for the transfer of electrical energy to the detecting means by electromagnetic action when the tester is in a testing position. The centre-tapped winding of the detecting means being connected through the primary of an iron core transformer acting as a bias transformer to a centre tap on an iron core transformer acting as an output transformer. The primary of the bias transformer when activated by a current that flows therein when the output of the detecting winding is not traversing exclusively the lead wires 29 and 30 provides an E. M. F. in the secondary thereof for canceling the effect of the said current flowing in the affected section of the output transformer on the indicating means, electronic hookup of the output and biasing transformers on the secondary side being ideally suited from an amplification, biasing and indicating standpoint. The purpose of the centre-tapped windings of the detecting means and output transformer, biasing transformer and circuit is to guard against spurious indications on the indicating means in the event of a non-uniform magnetic density in the magnetic circuit of the detecting means due to off course magnetism from the inducing means taking a path so as to link part of the winding of the detecting means under various conditions of testing use as hereinafter described.

In manual use to test for a short-circuited turn or turns in a coil installed in an armature or stator of a dynamo-electric machine, the tester is placed so that the pole-faces of its ferromagnetic structures bridge a slot in the armature or stator in which lies a coil-side of the coil to be tested, with the inducing means supplied from an alternating current supply and the detecting means connected in an operative condition with the indicating means the tester is moved from slot to slot until testing is completed, a short-circuited turn or turns present in the coil under test will be indicated by an indication on the indicating means, to test for an open-circuit in a rotor-bar of a squirrel-cage rotor winding the tester is placed and moved in the same manner, when over an open-circuited rotor-bar that fact will be indicated by no indication or movement of the indicating means.

In theory if the coil under test contains at least one short-circuited turn or forms a closed circuit an induced current will be set-up in the part comprising the short or closed circuit, the magnetic field set-up by this current will induce by electromagnetic action in the detecting winding an E. M. F. the value thereof being governed by: the magnitude and frequency of the induced current, the number of turns in the detecting winding and the amount of magnetic reluctance in the magnetic circuits of the tester.

In production testing of coils installed in slots of an armature or of rotor bars installed in slots of a rotor of a dynamo-electric machine, the armature or rotor is placed so it can be revolved and the pole-faces of the ferromagnetic structures of the tester lining-up with the iron on both sides of a slot in an armature or rotor as the armature or rotor is revolved and so placed that an air-gap for mechanical clearance will exist between the tester's pole-faces and the armature or rotor, with the tester in an operative condition the armature or rotor is then revolved until testing is completed.

To production test coils before installation in electrical apparatus, two arrangements are possible, manual or automatic in both arrangements a slotted laminated ferromagnetic block is required to provide a receptacle for a coil-side of a coil to be tested.

In production manual testing the tester is placed preferably above the coil-side receptacle and so arranged that when in a position for testing to bridge the slot in the receptacle in the same manner as when testing a coil already installed in an armature of a dynamo-electric machine.

In automatic production testing a series of slotted receptacles can be positioned along a conveyor, the conveyor bringing each coil in turn under the tester, the tester being mounted in a fixed position above the conveyor with an air-gap existing for mechanical clearance between the tester's pole-faces and the coils located in the receptacles, the output of the tester to actuate if desired a faulty coil marking or reject mechanism.

In production testing the containing case may be dispensed with in settings where its use is not required and the inducing means and detecting means secured in position to carry-out the testing function of the combination. In production testing wherein the tester works through an air-gap the inducing means may be provided with a cooling media if required to take care of the heating thereof due to the intermittent action of the operation. In using alternating current to supply the inducing means the tester is adaptable to manual or automatic testing of coils before or after installation in electrical apparatus. In using direct current to supply a suitably designed direct current inducing winding the tester is adaptable to manual or automatic testing of coils in settings wherein electromagnetic action can be brought about between the inducing flux and the coil under test, the same holds for a permanent magnetized structure providing the inducing flux.

A plate circuit relay in the plate circuit of amplifier 72 to open the electric circuit of the indicating means may be employed if desired in lieu of grid-bias control of amplifier 64 when the output of the detecting winding does not traverse exclusively the lead wires 29 and 30 of the detecting winding.

Switches may be placed on or external to the tester to close or open the electric circuits thereof.

Various changes in the construction and arrangement may be made without departing from the spirit of the invention as limited and defined by the appended claims.

I claim:

1. Apparatus for testing an electric coil comprising inducing means and detecting means adapted to be placed in operative sympathetic magnetic relation to a coil under test, said inducing means generating at one location with respect to the coil an electromagnetic field for the purpose of inducing in the coil a current, said detecting means detecting at another location with respect to the coil whether or not a current has actually been induced in the coil, said detecting means having a center-tapped winding, a first transformer having a center-tapped winding, the outside connections of said winding being connected to the outside connections of the center-tapped winding, a second transformer having a primary connected in series between the center taps of the center-tapped detecting means winding and of the primary of the first transformer, a first amplifier connected to the secondary of the first transformer, indicating means connected to the first amplifier for indicating whether or not the coil is short-circuited, and a second amplifier connected to the secondary of said second transformer, the output of said second amplifier being effective to influence the indicating means whereby to avoid spurious indications on the indicating means in the event of a non-uniform linkage of the detecting means winding with the coil alone.

2. The apparatus according to claim 1, in which said second amplifier output is connected to said first amplifier to provide a signal cancelling the effect on the first amplifier of any current flowing through the second transformer.

3. The apparatus according to claim 1, including means connected to said second amplifier for deactivating the indicating means when current flows through the second transformer.

4. The apparatus according to claim 1, in which said inducing means comprises a series winding on a laminated ferromagnetic U-shaped core, said detecting means comprises two separate coils with a center tap therebetween mounted on a laminated ferromagnetic U-shaped core, and a figure 8-shaped casing for the inducing means and the detecting means, the poles of said cores extending outwardly through one end of said casing.

5. A method of electrical coil testing comprising generating a primary electromagnetic field at one location in respect to the coil to be tested, detecting a secondary electromagnetic field at another location in respect to the coil by virtue of the fact that one or more turns are short-circuited, producing a signal in response to such detecting operation, and correcting such signal in the event that such signal is due to detecting a part of the primary electromagnetic field rather than due entirely to detecting the secondary electromagnetic field.

References Cited in the file of this patent
UNITED STATES PATENTS

| | | |
|---|---|---|
| 1,992,013 | Palueff | Feb. 19, 1935 |
| 2,152,690 | Hana | Apr. 4, 1939 |
| 2,645,753 | Dutschke | July 14, 1953 |